US011882557B2

(12) United States Patent
Malichenko et al.

(10) Patent No.: US 11,882,557 B2
(45) Date of Patent: Jan. 23, 2024

(54) ADAPTIVE UL DURATION SELECTION

(71) Applicant: MAXLINEAR, INC, Carlsbad, CA (US)

(72) Inventors: Dmitrii Malichenko, Saint-Petersburg (RU); Sigurd Schelstraete, Menlo Park, CA (US)

(73) Assignee: MaxLinear, Inc., Carlsbad, CA (US)

( * ) Notice: Subject to any disclaimer, the term of this patent is extended or adjusted under 35 U.S.C. 154(b) by 246 days.

(21) Appl. No.: 17/524,519

(22) Filed: Nov. 11, 2021

(65) Prior Publication Data

US 2022/0369335 A1 Nov. 17, 2022

(30) Foreign Application Priority Data

May 11, 2021 (RU) .......................... RU2021113354

(51) Int. Cl.
| | |
|---|---|
| *H04W 72/1268* | (2023.01) |
| *H04W 28/02* | (2009.01) |
| *H04B 17/318* | (2015.01) |
| *H04W 72/542* | (2023.01) |

(52) U.S. Cl.
CPC ...... *H04W 72/1268* (2013.01); *H04B 17/318* (2015.01); *H04W 28/0278* (2013.01); *H04W 72/542* (2023.01)

(58) Field of Classification Search
CPC ......... H04W 72/1268; H04W 28/0278; H04W 72/542; H04W 72/52; H04W 28/065; H04W 84/12; H04B 17/318
See application file for complete search history.

(56) References Cited

U.S. PATENT DOCUMENTS

| | | | | |
|---|---|---|---|---|
| 2007/0076754 A1* | 4/2007 | Krishnaswamy | ....... | H04L 45/22 370/468 |
| 2011/0096665 A1* | 4/2011 | McCann | ................. | H04L 47/27 370/235 |
| 2012/0253780 A1* | 10/2012 | Talla | ..................... | H04L 47/122 703/23 |
| 2013/0201863 A1* | 8/2013 | Chan | ..................... | H04W 28/02 370/253 |
| 2013/0329598 A1* | 12/2013 | DiFazio | .............. | H04W 72/542 370/254 |

(Continued)

OTHER PUBLICATIONS

Moon and J. Mo, "Optimizing uplink TCP-ACK transmission in WiMAZ OFDMA systems," in IEEE Communications Letters, vol. 12, No. 4, pp. 256-258, Apr. 2008, doi: 10.1109/LCOMM.2008.071849.

(Continued)

*Primary Examiner* — Dinh Nguyen
(74) *Attorney, Agent, or Firm* — Buchalter; Jason W. Croft (57) ABSTRACT

A method to adaptively select uplink (UL) duration includes collecting UL transmission statistics for UL transmissions from multiple client stations to an access point (AP). The method includes estimating, based on the UL transmission statistics, an amount of queued UL data at the client stations for a next UL transmission. The method includes determining, based on the estimated amount of queued UL data and the UL transmission statistics, one or more UL durations for the next UL transmission. The method includes sending the client stations scheduling information with the determined one or more UL durations to initiate the next UL transmission from the client stations to the AP.

20 Claims, 6 Drawing Sheets

(56) References Cited

U.S. PATENT DOCUMENTS

2017/0332385 A1 11/2017 Shirali et al.
2018/0115795 A1* 4/2018 Chinnaiyan .... H04N 21/234381

OTHER PUBLICATIONS

T. Lee, Y. Huang and C. Yang, "A low overhead queue status report scheme for QoS support in WLANs," TENCON 2009—2009 IEEE Region 10 Conference, Singapore, 2009, pp. 1-5, doi: 10.1109/TENCON.2009.5396072.

M. Tesanovic, M.P.J. Baker, T.J. Moulsley, "Low-overhead buffer level signalling using weighted prioritisation" Electronics Letters vol. 45, Issue 25, Dec. 3, 2009, p. 1351-1352 DOI: 10.1049/el.2009.2994.

A. K. Abraham, "An optimized method of buffer status reporting for uplink data in LTE," 2015 IEEE International Conference on Electrical, Computer and Communication Technologies (ICECCT), Coimbatore, India, 2015, pp. 1-4, doi: 10.1109/ICECCT.2015.7226188.

* cited by examiner

| MPDU Aggregation | TB PPDU Length | OFDMA | | SU | |
|---|---|---|---|---|---|
| | | UL TP (Mbps) | Avgerage Latency (ms) | UL TP (Mbps) | Average Latency (ms) |
| 64 | 256 | 64.75 | 1.36 | 82.31 | 1.68 |
| | 512 | 88.4 | 1.27 | 82.31 | 1.68 |
| | 1500 | 73.89 | 1.69 | 82.31 | 1.68 |
| | 2500 | 46.79 | 2.71 | 82.31 | 1.68 |
| | 3500 | 34.34 | 3.72 | 82.31 | 1.68 |
| | 4500 | 27.13 | 4.72 | 82.31 | 1.68 |
| | 5500 | 22.41 | 5.71 | 82.31 | 1.68 |
| 128 | 256 | 65.57 | 2.55 | 106.63 | 2.8 |
| | 512 | 98.32 | 1.71 | 106.63 | 2.8 |
| | 1500 | 132.82 | 1.88 | 106.63 | 2.8 |
| | 2500 | 92.8 | 2.73 | 106.63 | 2.8 |
| | 3500 | 68.35 | 3.74 | 106.63 | 2.8 |
| | 4500 | 53.94 | 4.76 | 106.63 | 2.8 |
| | 5500 | 44.56 | 5.76 | 106.63 | 2.8 |
| 256 | 256 | 71.23 | 5.03 | 130.94 | 4.52 |
| | 512 | 102.88 | 3.57 | 130.94 | 4.52 |
| | 1500 | 129.86 | 3.27 | 130.94 | 4.52 |
| | 2500 | 142.76 | 3.41 | 130.94 | 4.52 |
| | 3500 | 135.27 | 3.78 | 130.94 | 4.52 |
| | 4500 | 106.69 | 4.82 | 130.94 | 4.52 |
| | 5500 | 88.08 | 5.83 | 130.94 | 4.52 |

ADAPTIVE UL DURATION SELECTION

FIELD

The implementations discussed herein relate to adaptive uplink (UL) duration selection.

BACKGROUND

Unless otherwise indicated in the present disclosure, the materials described in the present disclosure are not prior art to the claims in the present application and are not admitted to be prior art by inclusion in this section.

Home, office, stadium, and outdoor networks, a.k.a. wireless local area networks (WLAN) are established using a device called an Access Point (AP). The AP may include a router. The AP wirelessly couples all the devices of the local network, e.g. wireless stations such as: computers, printers, televisions, digital video (DVD) players, security cameras and smoke detectors to one another and to the Cable or Subscriber Line through which Internet, video, and television is delivered to the local network. Most APs implement the IEEE 802.11 standard which is a contention-based standard for handling communications among multiple competing devices for a shared wireless communication medium on a selected one of various communication channels. The frequency range of each communication channel is specified in the corresponding one of the IEEE 802.11 protocols being implemented, e.g. "a", "b", "g", "n", "ac", "ad", "ax". Communications follow a hub and spoke model with a WAP at the hub and the spokes corresponding to the wireless links to each 'client' device or wireless station (STA).

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

The implementations discussed herein relate to adaptive UL duration selection.

In an implementation, a method to adaptively select uplink (UL) duration includes collecting UL transmission statistics for UL transmissions from multiple client stations to an access point (AP). The method includes estimating, based on the UL transmission statistics, an amount of queued UL data at the client stations for a next UL transmission. The method includes determining, based on the estimated amount of queued UL data and the UL transmission statistics, one or more UL durations for the next UL transmission. The method includes sending the client stations scheduling information with the determined one or more UL durations to initiate the next UL transmission from the client stations to the AP.

In another implementation, a wireless communication device includes a processor device and a non-transitory computer-readable storage medium communicatively coupled to the processor device. The non-transitory computer-readable storage medium has computer-readable instructions stored thereon that are executable by the processor device to perform or control performance of operations. The operations include collecting UL transmission statistics for UL transmissions from multiple client stations to an access point (AP). The operations include estimating, based on the UL transmission statistics, an amount of queued UL data at the client stations for a next UL transmission. The operations include determining, based on the estimated amount of queued UL data and the UL transmission statistics, one or more UL durations for the next UL transmission. The operations include sending the client stations scheduling information with the determined one or more UL durations to initiate the next UL transmission from the client stations to the AP.

BRIEF DESCRIPTION OF THE DRAWINGS

Example implementations will be described and explained with additional specificity and detail through the use of the accompanying drawings in which.

DETAILED DESCRIPTION

Orthogonal frequency divisional multiple access (OFDMA) is a transmission mode that allows multi-user access by subdividing a channel, e.g., by assigning subsets of subcarriers to individual users. OFDMA may allocate the whole channel to a single user at one time or it may subdivide the channel to serve multiple users at the same time. OFDMA may have better frequency reuse, reduced latency, and increased efficiency in dense environments for low-bandwidth applications when compared to some other transmission modes.

To use OFDMA for UL transmission, an AP may tell client stations a packet duration to be used for UL data. Specifically, UL OFDMA operation may indicate a trigger-based (TB) physical (PHY) layer protocol data unit (PPDU) length in a trigger frame, which may be sent to the client stations prior to UL transmission. Performance of UL OFDMA may be affected by the value of the TB PPDU length. If a client station only has enough data for a short packet for UL transmission then setting a big TB PPDU length may waste medium resource and may decrease transmission performance. If a client station has enough data for a long packet for UL transmission then setting a small TB PPDU length may lead to unnecessary multiple UL transmissions, which may be contrary to an objective of OFDMA transmission to decrease the amount of transmissions. Some implementations herein may adaptively select one or more UL durations, such as TB PPDU length, for UL transmission to drive it to an optimal value. UL OFDMA with proper TB PPDU length selected can improve transmission control protocol (TCP) transmissions by leveraging effective transmission of TCP acknowledgement packets (ACKs).

These and other implementations of the present disclosure will be explained with reference to the accompanying figures. It is to be understood that the figures are diagrammatic and schematic representations of such example implementations, and are not limiting, nor are they necessarily drawn to scale. In the figures, features with like numbers indicate like structure and function unless described otherwise.

FIGS. 1A-1D illustrate an example operating environment 100 that may implement adaptive UL duration selection. The environment 100 includes an access point (AP) 102 and multiple client stations, including a first client station 104A, a second client station 104B, a third client station 104C, and a fourth client station STA 104D, collectively referred to herein as client stations 104.

In general, the client stations 104 and the AP 102 may be configured to communicate wirelessly with each other, including sending and receiving data packets. Each of the client stations 104 and the AP 102 may be considered a sender node when sending data or a receiver node when receiving data. The AP 102 may include a gateway, a repeater, a mesh node, and/or other suitable access point for wireless stations or devices such as the client stations 104. The AP 102 may connect to the Internet and/or a core network via a bridge, a backhaul link, a base station, and/or other suitable devices or connections. Each of the client stations 104 may include a desktop computer, a laptop computer, a tablet computer, a mobile phone, a smartphone, a printer, a smart television, a digital video disc (DVD) player, a security camera, a smart device, or any other device configured for wireless communication. In these and other implementations, each of the AP 102 and the client stations 104 may implement one or more of the IEEE 802.11 protocols or other wireless communication protocols.

The AP 102 and the client stations 104 may communicate with each other according to one or more transmission modes that may be included or specified in a corresponding wireless communication protocol implemented by the AP 102 and the client stations 104. For example, the AP 102 and the client stations 104 may communicate with each other using multiple input, multiple output (MIMO), single-user (SU)-MIMO, multi-user (MU)-MIMO, orthogonal frequency division multiplexing (OFDM), OFDMA, time division multiple access (TDMA), or other transmission mode(s).

In some implementations, the AP 102 and/or the client stations 104 communicate with each other according to a single transmission mode or a subset of all potential transmission modes. In these and other implementations, the AP 102 may collect UL transmission statistics, estimate an amount of queued UL data at the client stations 104 based on the statistics, determine one or more UL durations for the next UL transmission in the transmission mode, and send the client stations 104 scheduling information with the determined one or more UL durations to initiate the next UL transmission from the client station 104 to the AP 102. Where the AP 102 and the client stations 104 can communicate in the OFDMA transmission mode, the scheduling information may be included in a trigger frame and the one or more UL durations may include a TB PPDU length. Where the AP 102 and the client stations 104 can communicate in the TDMA transmission mode, the scheduling information may be included in a scheduling frame and the one or more UL durations may include TDMA time slots for the client stations 104 for a next TDMA UL frame.

In some implementations, the AP 102 and the client stations 104 may dynamically switch between transmission modes depending on, e.g., an estimated amount of queued UL data at the client stations 104. For example, where the client stations 104 have about the same or are estimated to have about the same amount of UL data queued for transmission to the AP 102, the AP 102 may signal the client stations 104 to transmit their UL data simultaneously in an OFDMA UL transmission. The AP 102 may signal the client stations 104 by sending them scheduling information, e.g., a in a scheduling frame such as a trigger frame that includes or specifies a TB-PPDU length. Where the client stations 104 have different or are estimated to have different amounts of UL data queued for transmission to the AP 102, the AP 102 may signal the client stations 104 to transmit their UL data sequentially, e.g., in a TDMA frame, with a different UL duration allocated to each of the client stations 104 depending on the amount of UL data queued or estimated to be queued for transmission to the AP 102. The AP 102 may signal the client stations 104 by sending them scheduling information that includes and/or specifies client-specific TDMA time slots, including both a duration and location of each corresponding client-specific TDMA time slot in the TDMA frame. In these and other examples, the AP 102 may adaptively select UL duration, e.g., trigger-based (TB) PPDU length or TDMA time slot duration, for the client stations 104 as a group or individually.

In some implementations, scheduling information that includes UL duration may be sent to the client stations 104 in scheduling frames. For example, scheduling information may be sent to the client stations 104 in trigger frames that include or specify TB-PPDU length and/or in scheduling frames that include and/or specify client-specific TDMA time slots. In some implementations, scheduling information that includes UL duration may be implicitly indicated to client stations and/or may be attached to a downlink (DL) data frame.

Figure 1A:
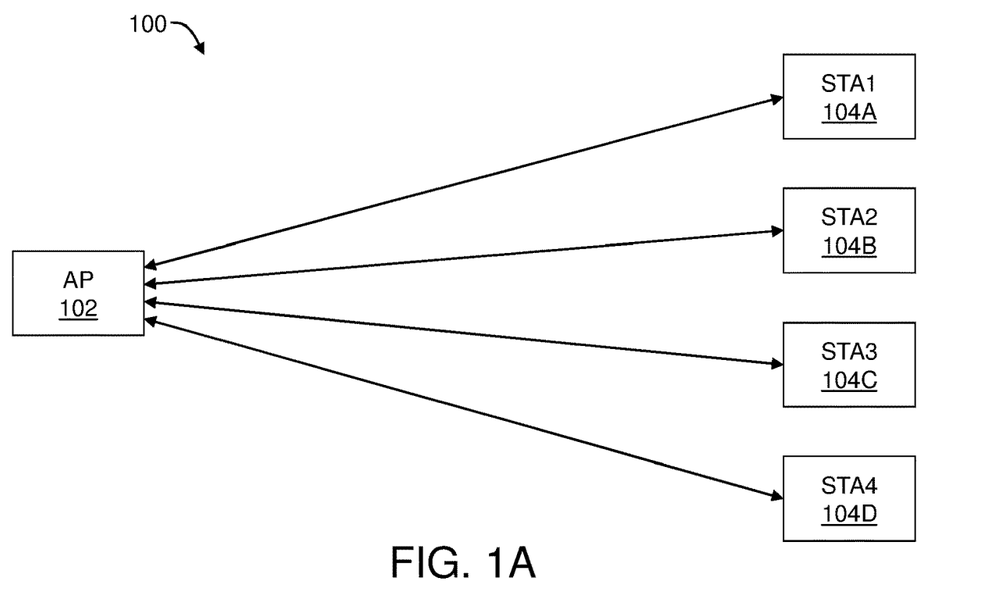
FIGS. 1A-1D illustrate an example operating environment that may implement adaptive UL duration selection.

To implement adaptive selection of UL duration, and referring to FIG. 1A, the AP 102 may collect UL transmission statistics for UL transmissions from the client stations 104 to the AP 102. In some implementations, the UL transmission statistics may be collected for and/or after each UL transmission. Alternatively or additionally, an age (e.g., based on a timestamp) of each of the UL transmission statistics may be recorded and/or may influence how the UL transmission statistics are used in adaptive selection of UL duration. For example, some UL transmission statistics may be weighted inversely with age such that older UL transmission statistics affect the adaptive selection of UL duration less than newer UL transmission statistics.

The UL transmission statistics may include one or more of the following: received signal strength indicator (RSSI); packet error rate (PER); number of retries; a number of UL transmissions (e.g., OFDMA UL transmissions, SU transmissions) over a preceding window of a selected duration of time; padding duration of UL transmissions from the client stations 104 to the AP 102; unused allocated UL duration; level of media access control (MAC) protocol data unit (MPDU) aggregation of the UL transmissions; number of bytes transmitted in the UL transmissions; modulation and coding scheme (MCS) of the UL transmissions; UL queue size estimate of each of the client stations 104 reported in a most recent buffer status report (BSR) from each of the client stations 104; UL queue size estimate of each of the client stations 104 reported in a most recent Quality of Service (QoS) Control field of a MAC frame from each of the client stations 104, or other UL transmission statistics. The UL transmission statistics may be collected for the client stations 104 or their UL transmissions individually or collectively as a group.

The AP 102 may estimate, based on the UL transmission statistics, an amount of queued UL data at the client stations 104 for a next UL transmission. For example, referring to FIG. 1B, the AP 102 may estimate that the client stations 104 have data 106A, 106B, 106C, 106D (hereinafter collectively or generically "data 106") queued for the next UL transmission to the AP 102. The client stations 104 may have, or may be estimated to have, equal or substantially equal amounts of data 106 queued for the next UL transmission, as illustrated in FIG. 1B, or different amounts of data 106 queued for the next UL transmission.

The AP 102 may then determine, based on the estimated amount of queued UL data and the UL transmission statistics, one or more UL durations for the next UL transmission. In some implementations, the one or more UL durations includes a TB PPDU length for a next OFDMA UL transmission from the client stations 104 to the AP 102. In this example, all the client stations 104 may be allocated the same UL duration, e.g., the same TB PPDU length, to simultaneously transmit their data 106 in the next OFDMA UL transmission, or more generally the next one or more OFDMA UL transmissions, to the AP 102. In some implementations, the one or more UL durations includes multiple client-specific UL durations of TDMA time slots for a next TDMA UL transmission from the client stations 104 to the AP 102. In this example, each of the client stations 104 may be allocated a corresponding client-specific UL duration to sequentially transmit their data 106 in the next TDMA frame, or more generally the next one or more TDMA frames, to the AP 102.

Figure 1B:
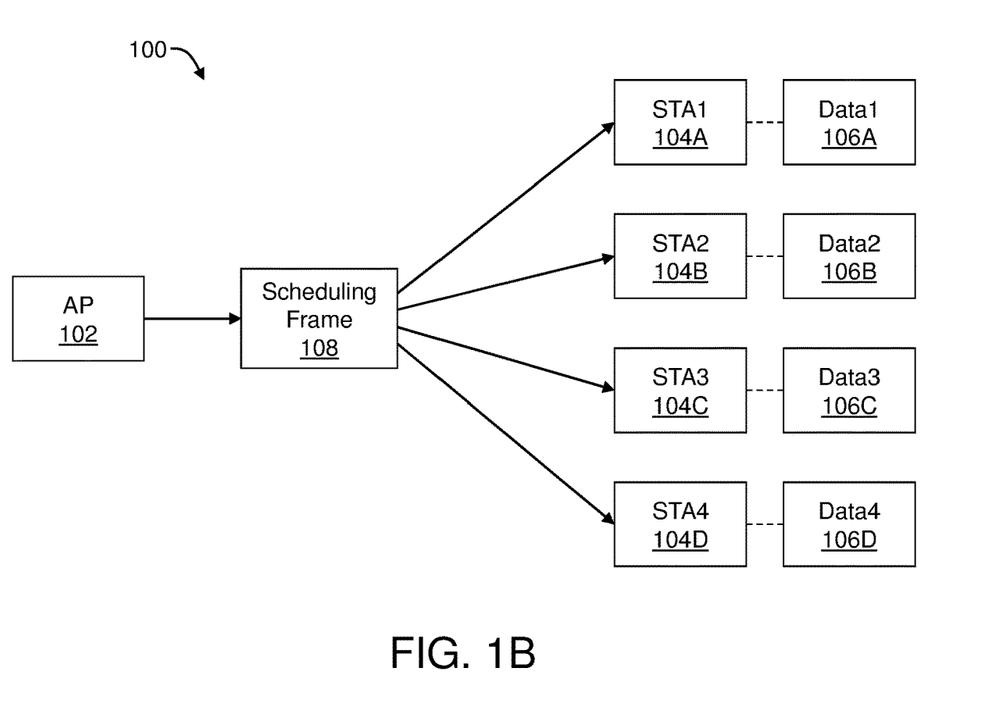

The AP 102 may then send the client stations 104 scheduling information, for example in a scheduling frame 108 as illustrated in FIG. 1B, with the determined one or more UL durations to initiate the next UL transmission, or more generally the next one or more UL transmissions, from the client stations 104 to the AP 102. When the determined one or more UL durations include a TB PPDU length, the scheduling frame 108 may be, include, or consist of a trigger frame that includes the TB PPDU length. When the determined one or more UL durations include client-specific UL durations of TDMA time slots, the scheduling frame 108 may include and/or specify the client-specific UL durations, e.g., a duration and location of each corresponding client-specific TDMA time slot in the TDMA frame.

Figure 1C:
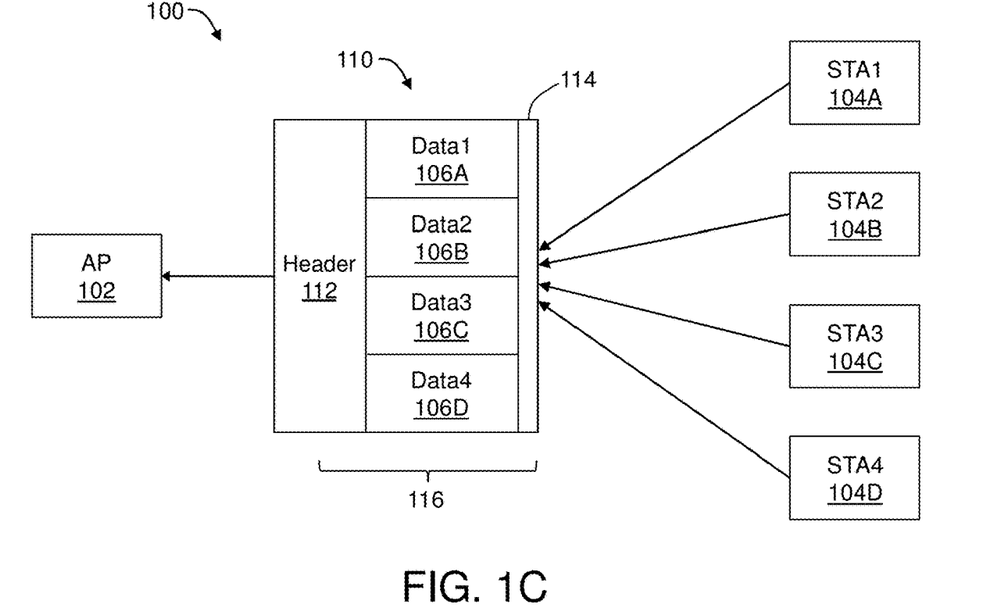

When the scheduling frame 108 of FIG. 1B is a trigger frame with TB PPDU length, the client stations 104 may send their data 106 to the AP 102 in an OFDMA UL transmission 110 as depicted in FIG. 1C. The OFDMA UL transmission 110 may include a header 112, the data 106 from the client stations 104 on different subcarriers following the header 112, and in some implementations padding 114 following the data 106. The data 106 in the OFDMA UL transmission 110 of all the client stations 104 may have the same length 116, which is the TB PPDU length indicated in the trigger frame. Some implementations herein may dynamically adjust the TB PPDU length 116 to drive a duration of the padding 114 to zero or close to zero while avoiding or at least reducing unnecessary multiple UL transmissions.

Figure 1D:
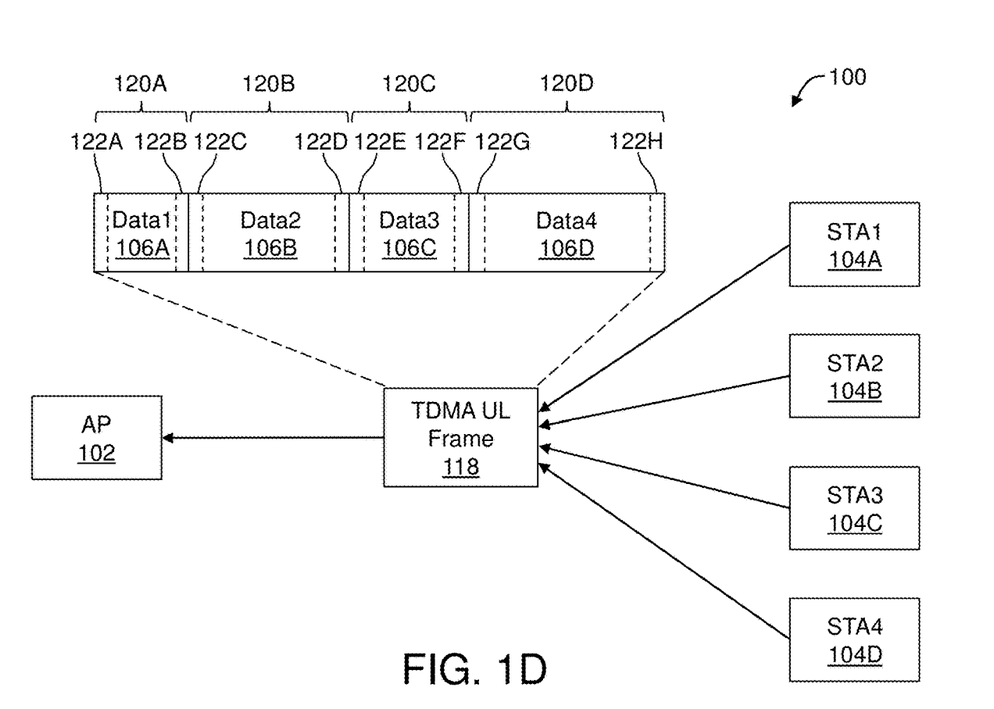

When the scheduling frame 108 of FIG. 1B is a scheduling frame with client-specific UL durations of TDMA time slots, the client stations 104 may send their data 106 to the AP 102 sequentially in a TDMA UL frame 118 as depicted in FIG. 1D. The TDMA UL frame 118 may include a TDMA time slot 120A, 120B, 120C, 120D (hereinafter collectively "TDMA time slots 120") for each of the client stations 104. In particular, the TDMA UL frame 118 may include the TDMA time slot 120A for the client station 104A, the TDMA time slot 120B for the client station 104B, the TDMA time slot 120C for the client station 104C, and the TDMA time slot 120D for the client station 104D. Each of the TDMA time slots 120 may have a corresponding client-specific UL duration, e.g., as specified and/or included in the scheduling frame 108, to accommodate the estimated amount of queued UL data at the client stations 104. Shorter TDMA time slots 120 may be allocated for client stations 104 with less data 106 while longer TDMA time slots 120 may be allocated for client stations 104 with more data 106. For example, if the client stations 104A and 104C have relatively less data 106A, 106C and the client stations 104B, 104D have relatively more data 106B, 106D, the TDMA time slots 120A, 120C may be relatively shorter and the TDMA time slots 120B, 120D may be relatively longer as illustrated in FIG. 1D. In some implementations, the data 106 within each time slot 102 may be preceded or followed by one or more guard intervals 122A-122H or the like, as illustrated in FIG. 1D. Although FIG. 1B depicts scheduling information being provided to the client stations 104 in the scheduling frame 108, in other implementations scheduling information may be provided to the client stations 104 implicitly and/or in a DL data frame or the like.

Some implementations are described herein in terms of optimizing (e.g., minimizing) padding. Other implementations may optimize other parameters individually or in combination. As an example, some implementations may optimize (e.g., minimize) number of UL transmissions, e.g., by increasing UL duration. As another example, some implementations may optimize (e.g., minimize) latency to accommodate periodic data delivery or for other purpose, e.g., by decreasing UL duration which may result in more UL transmissions. In these and other implementations, determining one or more UL durations for the next UL transmission may be based on a target number of UL transmissions (e.g., to optimize the number of UL transmissions) or a target latency (e.g., to optimize latency).

Figure 2:
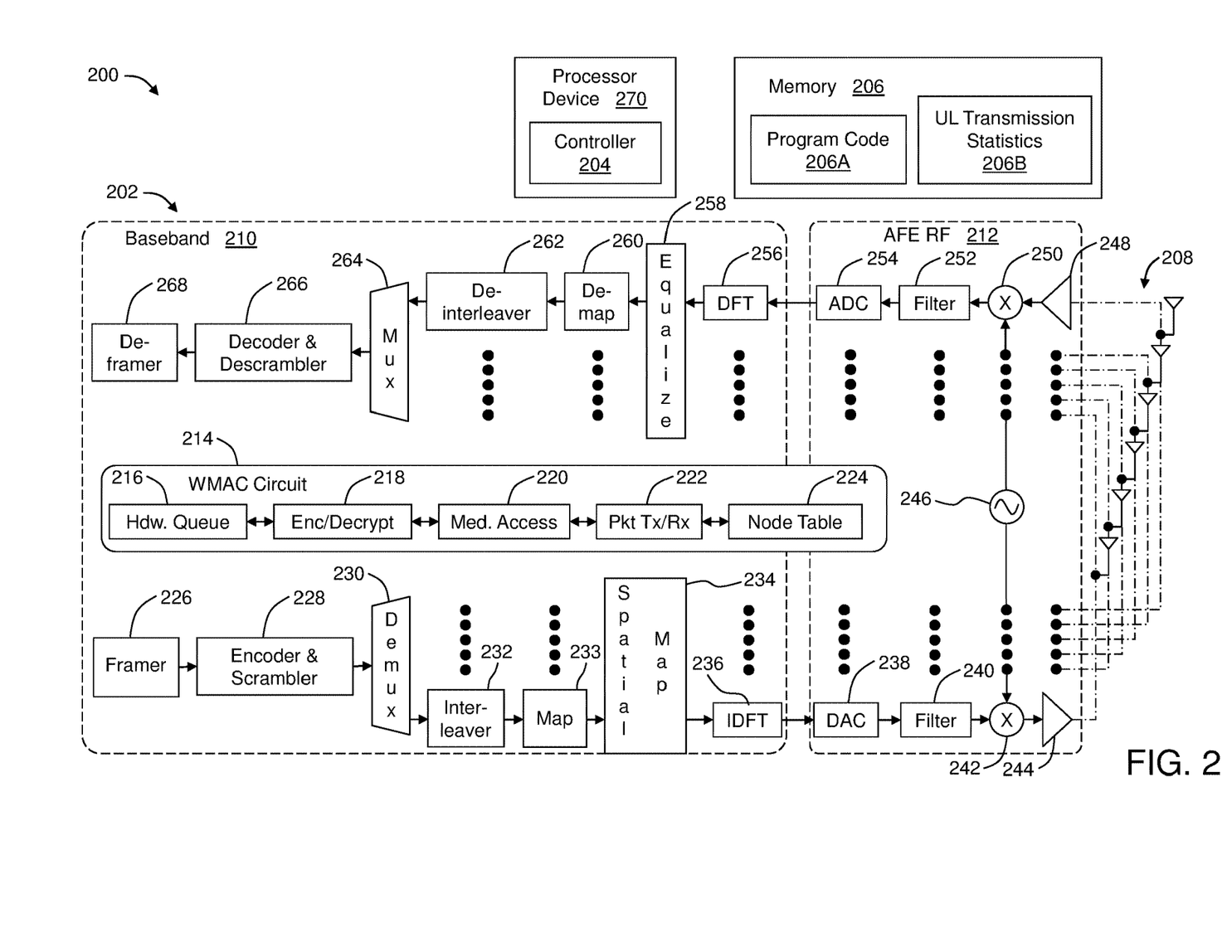
FIG. 2 is a block diagram of an example AP that may be implemented in the environment of FIGS. 1A-1D.

FIG. 2 is a block diagram of an example AP 200 that may be implemented in the environment 100 of FIGS. 1A-1D. The AP 200 may include, be included in, or correspond to the AP 102 of FIGS. 1A-1D. In general, the AP 200 may include a WiFi stage 202, a controller 204, and a non-volatile memory 206.

The WiFi stage 202 may generally include multiple shared and discrete components which make up various transmit and receive chains that are coupled to one or more antennas 208. The AP 200 is specifically illustrated as a 6×6 multiple-input multiple-output (MIMO) AP that supports as many as 6 discrete communication streams over six antennas 208. Alternatively, the AP 200 may include any number of antennas (e.g., 2×2, 4×4, 5×5, . . . , 16×16, etc). More generally, the AP 200 may include any suitable number of antennas 208 in any suitable arrangement such as MIMO, single-input single-output (SISO), single-input multiple-output (SIMO), or multiple-input single-output (MISO).

Although not illustrated in FIG. 2, the AP 200 may couple via an integral modem to one of a cable, a fiber, or a digital subscriber backbone connection to, e.g., the Internet. A packet bus (not illustrated in FIG. 2) may couple the modem to the WiFi stage 202. The WiFi stage 202 supports wireless communications, e.g. IEEE 802.11 compliant communications, on a WLAN (not illustrated in FIG. 2). As illustrated in FIG. 2, the WiFi stage 202 includes a baseband circuit 210 and an analog front end (AFE) and radio frequency (RF) (AFE RF) circuit 212.

In the baseband circuit 210, wireless communications transmitted to or received from each client station are processed. The AFE RF circuit 212 handles the upconversion on each transmit chain or path of wireless transmissions initiated in the baseband circuit 210. The AFE RF circuit 212 also handles the downconversion of signals received on the receive chains or paths and passes them for further processing to the baseband circuit 210.

Each transmit chain/path may include one or more of the following discrete and shared components. Data to be transmitted on the packet bus is initially processed by a WiFi medium access control (WMAC) circuit 214. The WMAC circuit 214 includes hardware queues 216 for each downlink and uplink communication stream; an encryption and decryption circuit 218 to encrypt and decrypt the downlink and uplink communication streams; a medium access circuit 220 to make the clear channel assessment (CCA), and to make exponential random backoff and re-transmission decisions; and a packet processor circuit 222 for packet processing of the transmitted and received communication streams. The WMAC circuit 214 may have access to a node table 224 which lists each node/STA on the WLAN, the STA's capabilities, each corresponding encryption key, and/or a priority associated with its communication traffic.

Each sounding packet or data packet for wireless transmission on the transmit chain components to one or more STAs is framed in a framer 226. Next each stream is encoded and scrambled in an encoder and scrambler 228 followed by demultiplexing in a demultiplexer 230 into separate streams. Next, streams are subject to interleaving in a corresponding one of multiple interleavers 232 and mapping in a corresponding one of multiple mappers 233. A single interleaver 232 and mapper 233 are illustrated in FIG. 2, with a series of five dots above each representing five replicate interleavers 232 or five replicate mappers 233 (e.g., for a total of six interleavers 232 and six mappers 233 including one interleaver 232 and one mapper 233 in each transmit chain in this example). Other components in FIG. 2 are similarly designated as having replicates by various series of dots.

Following interleaving and mapping, all transmissions are spatially mapped in a spatial mapper 234. The spatially mapped streams from the spatial mapper 234 are input to Inverse Discrete Fourier Transform (IDFT) circuits 236 for conversion from the frequency to the time domain and subsequent transmission in the AFE RF circuit 212.

Each IDFT circuit 236 is coupled to a corresponding transmit chain/path in the AFE RF circuit 212. Specifically, each IDFT circuit 236 couples to a corresponding DAC 238 to convert the digital transmission to analog, a corresponding filter 240, a corresponding RF upconverter 242, and a corresponding power amplifier 244. Each filter 240 may include a bandpass filter or other suitable filter. Each RF upconverter 242 is coupled to a local oscillator (LO) 246 to upconvert the transmission to an appropriate center frequency of a selected channel. Each power amplifier 244 may set a transmit power level of the transmission on the corresponding antenna of the corresponding antenna circuit 208 to which the corresponding transmit chain may be communicatively coupled at any given time. Outgoing signals or communications that reach the antennas of the antenna circuits 208 are radiated from the antennas, e.g., to STAs.

Each receive chain/path in the AFE RF circuit 212 may include one or more of the following discrete and shared components. Received communications on antennas of the antenna circuits 208 are subject to RF processing in the AFE RF circuit 212 including downconversion in the AFE RF circuit 212. There are six receive paths in the illustrated implementation, each including one or more of the following discrete and shared components: a low noise amplifier (LNA) 248 to amplify the received signal under control of an AGC (not illustrated in FIG. 2) to set an amount by which the received signal is amplified, an RF downconverter 250 coupled to the LO 246 to downconvert the received signal, a filter 252, e.g., to bandpass filter the received signal, and an analog-to-digital converter (ADC) 254 to digitize the downconverted signal. The digital output from each ADC 254 is passed to a corresponding discrete Fourier transform (DFT) circuit 256 in the baseband circuit 210 of the WiFi stage 202 to convert from the time to the frequency domain.

Receive processing in the baseband circuit 210 may include one or more of the following shared and discrete components. First, an equalizer 258 is coupled to the output of the DFT 256 to mitigate channel impairments. The received WiFi streams at the output of the equalizer 258 are subject to demapping and deinterleaving in a corresponding demapper 260 and deinterleaver 262. Next, the received streams are multiplexed in multiplexer 264 and decoded and descrambled in a decoder and descrambler 266, followed by de-framing in a deframer 268. The received communication is then passed to the WMAC circuit 214 where it is decrypted with the encryption and decryption circuit 218 and placed in the appropriate upstream hardware queue 216 for upload to the Internet.

In an example implementation, the controller 204 may be instantiated by a processor device 270 executing program code 206A stored on the non-volatile memory 206. The controller 204 may generally be configured to control the AP 200 to perform one or more of the operations described herein, including one or more operations to adaptively select UL duration. For example, the controller 204 may be configured to control the AP 200 to collect UL transmission statistics 206B which may be stored on the non-volatile memory 206, estimate an amount of queued UL data at client stations (e.g., client stations 104) based on the UL transmission statistics 206B, determine UL duration(s) for a next UL transmission based on the amount of queued UL data and/or the UL transmission statistics 206B, and/or send the client stations scheduling information to initiate the next UL transmission as described herein.

The UL transmission statistics 206B used to estimate the amount of queued UL data at the client stations may include one or more of the example UL transmission statistics listed elsewhere herein. In an example, the UL transmission statistics 206B may include unused allocated UL duration in one or more prior UL transmissions. If the unused allocated UL duration is greater than zero indicating a client station or client stations lacked sufficient data to fill the entire allocated UL duration in one or more prior UL transmissions, the controller 204 may determine the UL duration for the next UL transmission as being less than the allocated UL duration. For example, the controller 204 may reduce the allocated UL duration for the next UL transmission by an amount that depends on the unused allocated UL duration, according to a predetermined formula, by a predetermined amount of bytes, and/or by a predetermined percentage. If the unused allocated UL duration is zero, which may indicate the client station or client stations had more data to send than could be accommodated by the allocated UL duration, the controller 204 may determine the UL duration for the next UL transmission as being more than the allocated UL duration. For example, the controller 204 may increase the allocated UL duration for the next UL transmission according to a predetermined formula, by a predetermined amount of bytes, and/or by a predetermined percentage.

In another example, the UL transmission statistics 206B may include level of MPDU aggregation of one or more prior UL transmissions, such as a most recent UL transmission. The UL throughput for a given UL duration may vary from one level of MPDU aggregation to another. Accordingly, the controller 204 may determine the UL duration for the next UL transmission in dependence on the level of MPDU aggregation as described below with respect to FIG. 4.

In another example, the UL transmission statistics 206B may include padding duration of UL transmissions, and particularly OFDMA UL transmissions, in one or more prior UL transmissions. If the padding duration is greater than zero indicating a client station or client stations lacked sufficient data to fill an entire TB PPDU length of one or more prior OFDMA UL transmissions, the controller 204 may determine the UL duration, and particularly the TB PPDU length, for the next OFDMA UL transmission as being less than the prior TB PPDU length. For example, the controller 204 may reduce the prior TB PPDU length by an amount that depends on the padding duration, according to a predetermined formula, by a predetermined amount of bytes, or by a predetermined percentage. If the padding duration is zero, which may indicate the client station or client stations had more data to send than could be accommodated by the prior TB PPDU length, the controller 204 may determine the TB PPDU length for the next OFDMA UL transmission as being more than prior TB PPDU length. For example, the controller 204 may increase the prior TB PPDU length for the next OFDMA UL transmission according to a predetermined formula, by a predetermined amount of bytes, and/or by a predetermined percentage.

In another example, the UL transmission statistics 206B may include PER or number of retries. If PER or number of retries is high (e.g., above a first threshold PER or first threshold number of retries), the controller 204 may determine to reduce MCS. At lower MCS, greater UL duration may be used to send a same amount of data. As such, the controller 204 may determine to increase the UL duration. Alternatively or additionally, if PER or number of retries is low (e.g., below a second threshold PER or second threshold number of retries), the controller 204 may determine to increase MCS. At higher MCS, less UL duration may be used to send a same amount of data. As such, the controller 204 may determine to decrease the UL duration.

In another example, the UL transmission statistics 206B may include a number of UL transmissions over a preceding window of a selected duration of time. If the number is high (e.g., above a first threshold), the controller 204 may determine whether multiple UL transmissions may be combined into one, e.g., by assigning a larger continuous UL duration. If so, the controller may determine to increase the UL duration.

In another example, the UL transmission statistics 206B may include UL queue size estimates of the client stations such as may be reported in a most recent BSR or QoS Control field of a MAC frame. The controller 204 may scale UL duration in proportion to the UL queue size estimates. The use of UL queue size estimates from BSRs or QoS Control fields may depend on whether the BSR or QoS Control field is newer than other existing UL transmission statistics 206B available to the controller 204. For example, suppose based on other existing UL transmission statistics 206B the controller 204 expects a previous UL duration X to increase by 10% but a more recent BSR or QoS Control field indicates a client station has UL data for an expected duration Y and the expected duration Y is significantly different than the previous UL duration X. In this case, the controller 204 may apply the 10% increase to the expected duration Y rather than the previous UL duration X to determine the new UL duration as 1.10× (expected duration Y). The controller 204 may then set the UL duration as the new UL duration. Alternatively or additionally, if the most recent BSR or QoS Control field indicates the client station has no more UL data, the controller 204 may set the UL duration to a default or initial value.

In another example, the UL transmission statistics 206B may include RSSI. A low RSSI may indicate that the corresponding link is of bad quality such that an expected future MCS may be lower than a current MCS. If RSSI is low (e.g., below a first threshold RSSI), the controller 204 may determine to increase the UL duration, e.g., to accommodate the lower expected future MCS.

In another example, the UL transmission statistics 206B may include MCS. If MCS is increased, the controller 204 may determine to decrease the UL duration. If MCS is decreased, the controller 204 may determine to increase the UL duration.

Alternatively or additionally, the estimation of an amount of queued UL data at the client stations for a next UL transmission and/or the determination of one or more UL durations for the next UL transmission may be based on DL transmission statistics. In these and other implementations, the DL transmission statistics may be collected, e.g., by the AP 200. The DL transmission statistics may include a number of bytes transmitted in DL and/or a number of DL transmissions. The controller 204 may estimate an expected number of TCP ACKs based on the number of DL transmissions and adjust the UL duration accordingly. If the number of DL transmissions is unavailable, the controller 204 may estimate the expected number of TCP ACKs based on a number of bytes transmitted in DL and adjust the UL duration accordingly. Whether the expected number of TCP ACKs is estimated based on the number of DL transmissions or the number of bytes transmitted in DL, the controller 204 may increase the UL duration if more TCP ACKs are expected or decrease the UL duration if less TCP ACKs are expected.

The controller 204 may estimate the amount of queued UL data and/or determine the one or more UL durations for the next UL transmission based on a single one of the UL transmission statistics or based on a combination of two or more of the UL transmission statistics. In addition, the controller 204 may control the WiFi stage 202 to send the scheduling information and operate accordingly.

In some implementations, some or all of the UL transmission statistics 206B may be collected without BSR polling, which may reduce overhead. Alternatively or additionally, adaptive selection of UL duration as described herein may be performed dynamically and/or on the fly while taking into account possible data generation at the client stations. For example, if unused allocated UL duration is zero, the UL duration can be increased for the next UL transmission; if the next UL transmission has an unused allocated UL duration of zero again, the UL duration can be increased again. In this manner, the UL duration can be increased to take into account data generation at the client stations without sending the client stations BSR poll packets and waiting to receive the BSRs from the client stations. In some implementations, adaptive selection of UL duration may improve TCP traffic performance and/or may be implemented at the AP 200 or other APs herein without requiring any modification of existing client stations.

Disclosed implementations may be different from and improve upon other techniques. For example, one technique in the 802.11 standard reports UL queue size in the QoS Control field of a MAC, referred to hereinafter as the QoS technique. The UL queue size reported in the QoS Control field according to the QoS technique is not very exact and may be outdated by the time the UL transmission is requested from the client station by the AP. In comparison, some implementations herein may decrease the outdating effect of buffer estimation, take into account possibility of new data generation at the client station, and/or predict or estimate buffer state at the client station at the moment of UL transmission.

As another example, BSR polling may be implemented in which the AP sends the client station a BSR poll packet. In response to the BSR poll packet, the client station sends the AP the BSR, from which the AP may estimate the buffer state (or the UL queue size) at the client station. However, buffer estimation from BSRs may not be very exact, particularly when BSRs are not requested very frequently to reduce overhead. While buffer estimation from BSRs may be more exact when BSRs are requested frequently (e.g., before every UL transmission), such an approach requires significant overhead that reduces efficiency. Whether BSRs are requested frequently or infrequently, this technique introduces significant overhead due to the BSR poll packet and the BSR transmission. Moreover, this technique requires an algorithm for BSR polling control. In comparison, some implementations herein may be more efficient as they may require less overhead (e.g., as a result of not exchanging BSR poll packets and BSR transmissions between the AP and client station) and may not require an algorithm for BSR polling control. For example, if the UL statistics indicate the current padding of OFDMA UL transmissions is zero, the AP may increase the TB PPDU length for the next OFDMA UL transmission immediately without first sending the client stations a BSR poll packet and waiting for the BSRs to determine that the amount of queued UL data at the client stations is more than can be accommodated by the current TB PPDU length. If the next OFDMA UL with the increased TB PPDU length is received at the AP and has padding greater than zero, the AP may, e.g., change the TB PPDU length back to its prior value immediately without first sending the client stations a BSR poll packet and waiting for the BSRs. While some implementations herein may collect UL queue size estimates from BSRs and/or QoS Control fields of MAC frames as part of the collected UL transmission statistics, other implementations may use other UL transmission statistics without collecting UL queue size estimates from BSRs and/or QoS Control fields of MAC frames.

Figure 3:
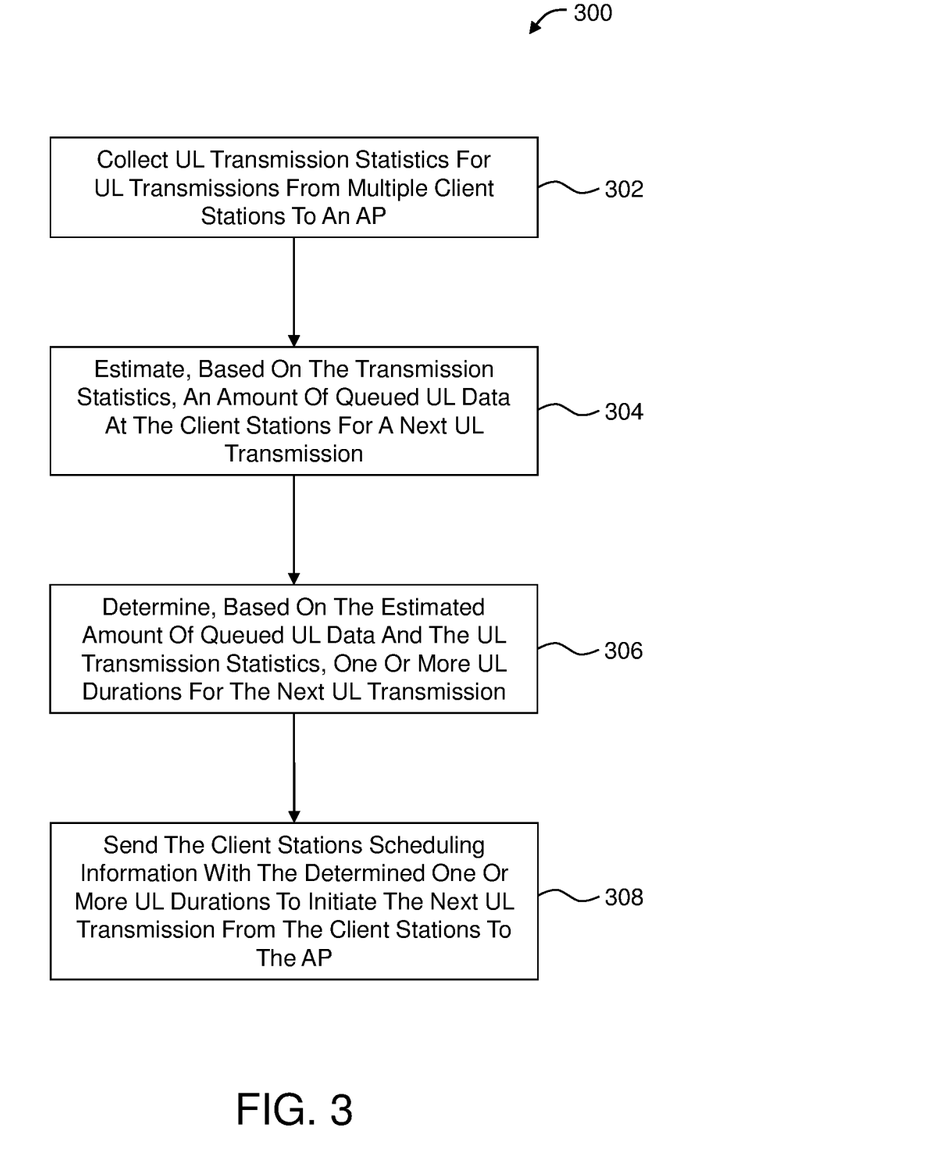
FIG. 3 illustrates a flowchart of an example method 300 to adaptively select UL duration.

FIG. 3 illustrates a flowchart of an example method 300 to adaptively select UL duration. The method 300 may be performed by any suitable system, apparatus, or device. For example, any of the APs 102, 200 of FIGS. 1A-2 may perform or direct performance of one or more of the operations associated with the method 300. For purposes of discussion, the method 300 is discussed as being performed by the AP 102 of FIGS. 1A-1D where the AP 102 includes or corresponds to the AP 200 of FIG. 2. The method 300 may include one or more of blocks 302, 304, 306, and/or 308.

At block 302, the method 300 may include collecting UL transmission statistics for UL transmissions from multiple client stations to an AP. For example, the AP 102 may collect the UL transmission statistics 206B for UL transmissions from the client stations 104 to the AP 102. Block 302 may be followed by block 304.

At block 304, the method 300 may include estimating, based on the UL transmission statistics, an amount of queued UL data at the client stations for a next UL transmission. For example, the AP 102 may estimate, based on the UL transmission statistics 206B, an amount of queued UL data at the client stations 104 for a next UL transmission. The next UL transmission may include a next OFDMA UL transmission, a next TDMA UL frame, or other next UL transmission. Block 304 may be followed by block 306.

At block 306, the method 300 may include determining, based on the estimated amount of queued UL data and the UL transmission statistics, one or more UL durations for the next UL transmission. For example, the AP 102 may determine, based on the amount of queued UL data estimated at block 304 and the UL transmission statistics 206B, one or more UL durations for the next UL transmission. Where the next UL transmission is an OFDMA UL transmission, the AP 102 may determine a single UL duration, e.g., a TB PPDU length, for all of the client stations 104. Where the next UL transmission is a TDMA UL frame, the AP may determine multiple UL durations, e.g., a different TDMA time slot with a client-specific UL duration for each of the client stations 104. In some implementations, the UL duration may be determined at block 306 indirectly from another parameter. For example, at block 306 the method 300 may include determining a number of bytes to be transmitted in UL based on the estimated amount of queued UL data and the UL transmission statistics. The estimated number of bytes to be transmitted in UL may then be translated to UL duration depending on the MCS. Block 306 may be followed by block 308.

At block 308, the method 300 may include sending the client stations scheduling information with the determined one or more UL durations to initiate the next UL transmission from the client stations to the AP. For example, the AP 102 may send the client stations 104 the scheduling frame 108 with the determined UL durations to initiate the next OFDMA UL transmission, the next TDMA UL frame, or other next UL transmission. The scheduling information may be included in a trigger frame, other suitable scheduling frame, a DL data frame, or in another form.

In some implementations, the one or more UL durations includes a TB PPDU length and the next UL transmission includes a next OFDMA UL transmission. In this and other implementations, collecting the UL transmission statistics at block 302 may include collecting a level of MPDU aggregation of a most recent OFDMA UL transmission from the client stations to the AP and determining the TB PPDU length for the next OFDMA UL transmission at block 306 may depend on the level of MPDU aggregation.

The TB PPDU length may include a first TB PPDU length, the next OFDMA UL transmission may include a first next OFDMA UL transmission, and the scheduling information may be included in a first trigger frame. In this and other implementations, the method 300 may further include receiving the first next OFDMA UL transmission from the client stations. The method 300 may further include determining a padding duration of the first next OFDMA UL transmission. The method 300 may further include determining a second TB PPDU length for a second next OFDMA UL transmission based at least on the padding duration of the first next OFDMA UL transmission. The method 300 may further include sending the client stations a second trigger frame with the determined second TB PPDU length to initiate the second next OFDMA UL transmission from the client stations to the AP. In some implementations, in response to determining that the padding duration is greater than zero, determining the second TB PPDU length for the second next UL transmission may include decreasing the first TB PPDU length to the second TB PPDU length by an amount that depends on the padding duration. In some implementations, in response to determining that the padding duration is zero, determining the second TB PPDU length for the second next UL transmission may include increasing the first TB PPDU length to the second TB PPDU length. Increasing the first TB PPDU length to the second TB PPDU length may include increasing the first TB PPDU length to the second TB PPDU length according to a predetermined formula or by a predetermined amount of bytes or a predetermined percentage.

In some implementations, the next UL transmission may include a next TDMA UL frame. Determining the one or more UL durations at block 306 may include determining multiple client-specific UL durations of multiple TDMA time slots for the client stations in the next TDMA UL frame.

Alternatively or additionally, collecting the UL transmission statistics at block 302 may include collecting unused allocated UL duration. In response to determining that the unused allocated UL duration is greater than zero, determining the one or more UL durations for the next UL transmission may include decreasing a preceding UL duration. On the other hand, in response to determining that the unused allocated UL duration is zero, determining the one or more UL durations for the next UL transmission may include increasing a preceding UL duration.

In some implementations, the method 300 may include collecting DL transmission statistics, such as a number of DL transmissions in TCP transmission. The estimation of the amount of queued UL data at the client stations at block 304 and/or the determination of the one or more UL durations for the next UL transmission at block 306 may be based on the DL transmission statistics. For example, a number of expected TCP ACKs (e.g., as part of the estimated amount of queued UL data) may be determined based on the number of DL transmissions and the UL duration may be adjusted accordingly. More expected TCP ACKs may be determined for more DL transmissions which may lead to an increase in the UL duration at block 306. Alternatively, less expected TCP ACKs may be determined for less DL transmissions which may lead to a decrease in the UL duration at block 306.

Figure 4:
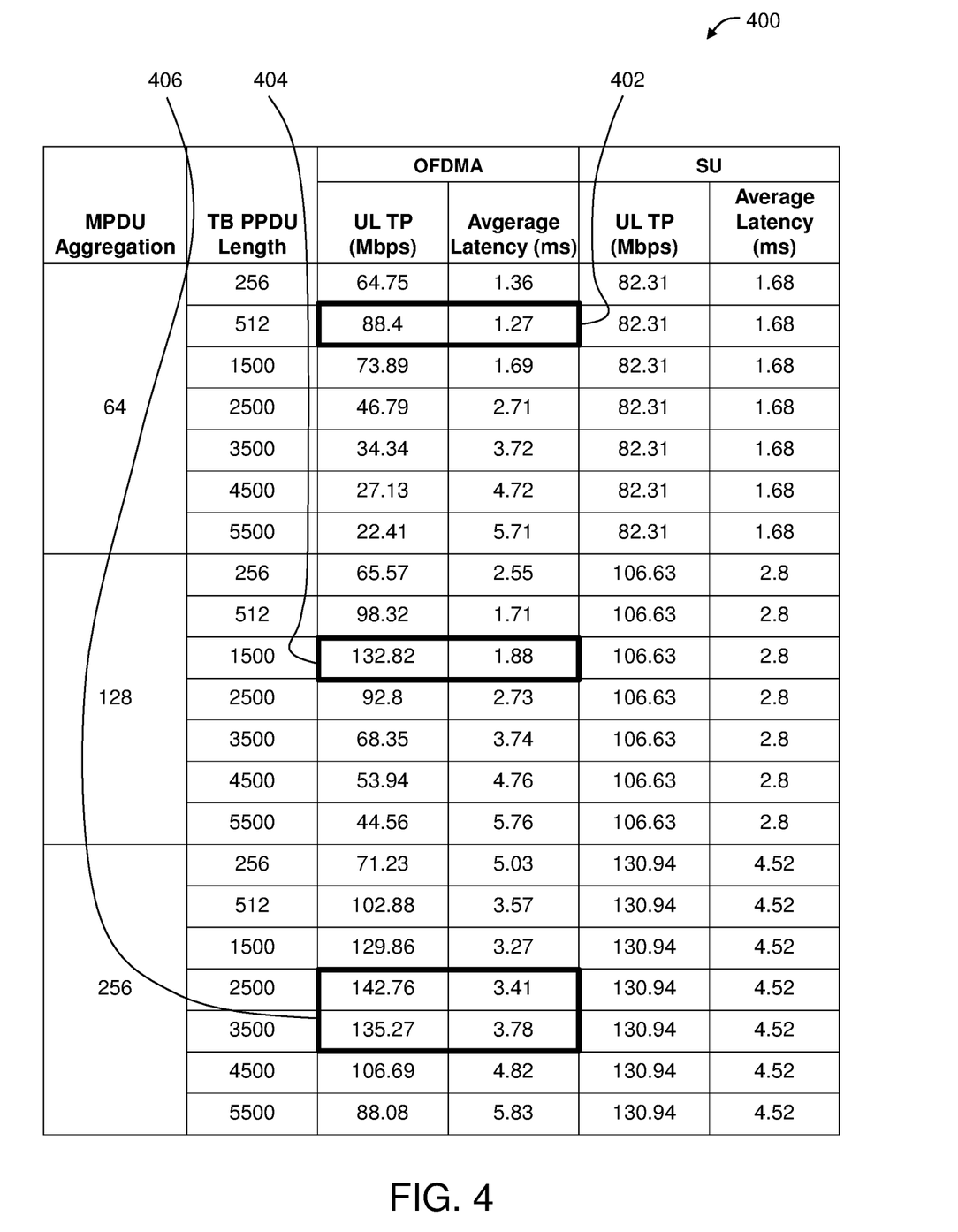
FIG. 4 is a simulation 400 comparing two technologies that may be used for UL transmission.

FIG. 4 is a simulation 400 comparing two technologies that may be used for UL transmission. In particular, the simulation 400 compares UL transmission (specifically OFDMA UL transmission) with adaptive UL duration selection (specifically adaptive TB PPDU length selection) as described herein to SU UL transmission without adaptive UL duration selection. The simulation 400 is for UL transmissions from four client stations to an AP at three different levels of MPDU aggregation, e.g., 64, 128, and 256.

As illustrated in FIG. 4, the UL throughput ("TP" in FIG. 4) and/or average latency for OFDMA UL transmissions may be better than that of SU UL transmissions with proper selection of TB PPDU length at a given level of MPDU aggregation. For example, for MPDU aggregation of 64, TB PPDU lengths of 256 and 512 result in lower average latency for OFDMA UL transmissions than for SU UL transmissions, while a TB PPDU length of 512 results in higher UL throughput for OFDMA UL transmissions than for SU UL transmissions. Thus, the TB PPDU length of 512 for MPDU aggregation of 64 has higher UL throughput and lower average latency for OFDMA UL transmissions than for SU UL transmissions, as highlighted at 402.

As another example, for MPDU aggregation of 128, TB PPDU lengths of 256, 512, 1500, and 2500 result in lower average latency for OFDMA UL transmissions than for SU UL transmissions, while a TB PPDU length of 1500 results in higher UL throughput for OFDMA UL transmissions than for SU UL transmissions. Thus, the TB PPDU length of 1500 for MPDU aggregation of 128 has higher UL throughput and lower average latency for OFDMA UL transmissions than for SU UL transmissions, as highlighted at 404.

As another example, for MPDU aggregation of 256, TB PPDU lengths of 512, 1500, 2500, and 3500 result in lower average latency for OFDMA UL transmissions than for SU UL transmissions, while TB PPDU lengths of 2500 and 3500 result in higher UL throughput for OFDMA UL transmissions than for SU UL transmissions. Thus, the TB PPDU lengths of 2500 and 3500 for MPDU aggregation of 256 has higher UL throughput and lower average latency for OFDMA UL transmissions than for SU UL transmissions, as highlighted at 406.

The TB PPDU lengths used in the simulation 400 are provided by way of example. In some implementations, the AP may select virtually any TB PPDU length, including 256, 512, 1500, 2500, 3500, 4500, 5500 as illustrated in the simulation 400, or any TB PPDU lengths therebetween, and more generally any TB PPDU length greater than zero.

As illustrated by the simulation 400 of FIG. 4, the particular TB PPDU length that optimizes UL throughput may vary from one level of MPDU aggregation to another. Further, as indicated at least by the highlighted UL throughput and average latencies 406, there may be multiple TB PPDU lengths at a given MPDU aggregation that result in higher UL throughput and lower average latency for OFDMA UL transmissions compared to SU UL transmissions. Thus, some deviation from a best or optimal TB PPDU length for OFDMA UL transmissions may still improve UL throughput and average latency compared to SU UL transmissions without being completely optimized.

Some implementations herein may improve TCP UL and/or DL transmissions by leveraging effective transmission of TCP ACKs. For example, a client station may send a TCP packet to an AP and the AP may send a TCP ACK to acknowledge receipt of the TCP packet. TCP may increase a duration of a TCP receive window during which data may be transmitted without ACKs, which can lead to higher throughput for DL transmissions from the AP to the client stations in this example. TCP may include one or more mechanisms or algorithms that determine when to increase or decrease the TCP receive window. Generally speaking, if there is little or no corruption, the TCP receive window may be increased which then increases throughput. On the other hand, if there are adverse conditions (e.g., poor channel conditions) or other factors that lead to significant data corruption, a number of retransmissions or retries is necessarily increased and the TCP receive window may be decreased. If the UL duration limits TCP ACKs, the TCP receive window may be decreased. However, if the UL duration is increased quickly enough and at the right time, e.g., according to implementations described herein, then the transmission of TCP ACKs may be made without delay (or with less delay) and the AP may increase the TCP receive window which in turn may increase DL throughput.

Figure 5:
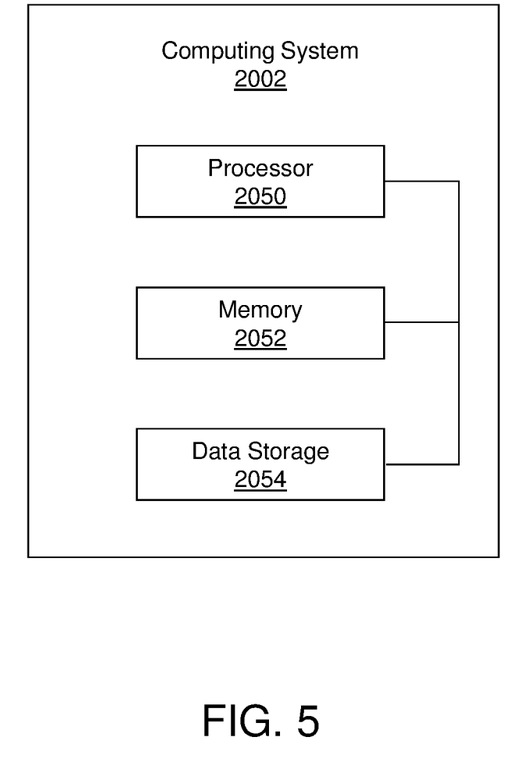
FIG. 5 illustrates a block diagram of an example computing system that may be used to perform or direct performance of one or more operations described according to at least one implementation of the present disclosure.

FIG. 5 illustrates a block diagram of an example computing system 2002 that may be used to perform or direct performance of one or more operations described according to at least one implementation of the present disclosure. The computing system 2002 may include a processor 2050, a memory 2052, and a data storage 2054. The processor 2050, the memory 2052, and the data storage 2054 may be communicatively coupled.

In general, the processor 2050 may include any suitable special-purpose or general-purpose computer, computing entity, or processing device including various computer hardware or software modules and may be configured to execute instructions stored on any applicable computer-readable storage media. For example, the processor 2050 may include a microprocessor, a microcontroller, a digital signal processor (DSP), an application-specific integrated circuit (ASIC), a Field-Programmable Gate Array (FPGA), or any other digital or analog circuitry configured to interpret and/or to execute computer-executable instructions and/or to process data. Although illustrated as a single processor, the processor 2050 may include any number of processors configured to, individually or collectively, perform or direct performance of any number of operations described in the present disclosure.

In some implementations, the processor 2050 may be configured to interpret and/or execute computer-executable instructions and/or process data stored in the memory 2052, the data storage 2054, or the memory 2052 and the data storage 2054. In some implementations, the processor 2050 may fetch computer-executable instructions from the data storage 2054 and load the computer-executable instructions in the memory 2052. After the computer-executable instructions are loaded into memory 2052, the processor 2050 may execute the computer-executable instructions.

The memory 2052 and the data storage 2054 may include computer-readable storage media for carrying or having computer-executable instructions or data structures stored thereon. Such computer-readable storage media may include any available media that may be accessed by a general-purpose or special-purpose computer, such as the processor 2050. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 2050 to perform a certain operation or group of operations.

Some portions of the detailed description refer to different modules configured to perform operations. One or more of the modules may include code and routines configured to enable a computing system to perform one or more of the operations described therewith. Additionally or alternatively, one or more of the modules may be implemented using hardware including any number of processors, microprocessors (e.g., to perform or control performance of one or more operations), DSPs, FPGAs, ASICs or any suitable combination of two or more thereof. Alternatively or additionally, one or more of the modules may be implemented using a combination of hardware and software. In the present disclosure, operations described as being performed by a particular module may include operations that the particular module may direct a corresponding system (e.g., a corresponding computing system) to perform. Further, the delineating between the different modules is to facilitate explanation of concepts described in the present disclosure and is not limiting. Further, one or more of the modules may be configured to perform more, fewer, and/or different operations than those described such that the modules may be combined or delineated differently than as described.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of configured operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. Computer-executable instructions may include, for example, instructions and data which cause a general-purpose computer, special-purpose computer, or special-purpose processing device (e.g., one or more processors) to perform or control performance of a certain function or group of functions.

Although the subject matter has been described in language specific to structural features and/or methodological acts, it is to be understood that the subject matter configured in the appended claims is not necessarily limited to the specific features or acts described above. Rather, the specific features and acts described above are disclosed as example forms of implementing the claims.

An example apparatus can include a Wireless Access Point (WAP) or a station and incorporating a VLSI processor and program code to support. An example transceiver couples via an integral modem to one of a cable, fiber or digital subscriber backbone connection to the Internet to support wireless communications, e.g. IEEE 802.11 compliant communications, on a Wireless Local Area Network (WLAN). The WiFi stage includes a baseband stage, and the analog front end (AFE) and RF stages. In the baseband portion wireless communications transmitted to or received from each user/client/station are processed. The AFE RF portion handles the upconversion on each of transmit paths of wireless transmissions initiated in the baseband. The RF portion also handles the downconversion of the signals received on the receive paths and passes them for further processing to the baseband.

An example apparatus can be a multiple-input multiple-output (MIMO) apparatus supporting as many as N×N discrete communication streams over N antennas. In an example the MIMO apparatus signal processing units can be implemented as N×N. In various implementations, the value of N can be 4, 6, 8, 12, 16, etc. Extended MIMO operation enables the use of up to 2N antennae in communication with another similarly equipped wireless system. It should be noted that extended MIMO systems can communicate with other wireless systems even if the systems do not have the same number of antennae, but some of the antennae of one of the stations might not be utilized, reducing optimal performance.

Channel State Information (CSI) from any of the devices described herein can be extracted independent of changes related to channel state parameters and used for spatial diagnosis services of the network such as motion detection, proximity detection, and localization which can be utilized in, for example, WLAN diagnosis, home security, health care monitoring, smart home utility control, elder care, automotive tracking and monitoring, home or mobile entertainment, automotive infotainment, and the like.

Unless specific arrangements described herein are mutually exclusive with one another, the various implementations described herein can be combined in whole or in part to enhance system functionality and/or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method to adaptively select uplink (UL) duration, the method comprising:
   collecting UL transmission statistics for UL transmissions from a plurality of client stations to an access point (AP);
   estimating, based on the UL transmission statistics, an amount of queued UL data at the plurality of client stations for a next UL transmission;
   determining, based on the estimated amount of queued UL data and the UL transmission statistics, one or more UL durations for the next UL transmission; and
   sending the plurality of client stations scheduling information with the determined one or more UL durations to initiate the next UL transmission from the plurality of client stations to the AP.

2. The method of claim 1, wherein collecting the UL transmission statistics includes collecting at least one of:
   received signal strength indicator (RSSI);
   packet error rate (PER);
   number of retries;
   number of UL transmissions over a preceding window of a selected duration of time;
   padding duration of UL transmissions from the plurality of client stations to the AP;
   unused allocated UL duration;
   level of media access control (MAC) protocol data unit (MPDU) aggregation of the UL transmissions;
   number of bytes transmitted in the UL transmissions;
   modulation and coding scheme (MCS) of the UL transmissions;
   UL queue size estimate of each of the plurality of client stations reported in a most recent buffer status report (BSR) from each of the plurality of client stations; or
   UL queue size estimate of each of the plurality of client stations reported in a most recent Quality of Service (QoS) Control field of a MAC frame from each of the plurality of client stations.

3. The method of claim 1, wherein the one or more UL durations comprises a trigger-based (TB) physical (PHY) layer protocol data unit (PPDU) length and the next UL transmission comprises a next orthogonal frequency division multiple access (OFDMA) UL transmission.

4. The method of claim 3, wherein:
   the collecting the UL transmission statistics includes collecting a level of media access control (MAC) protocol data unit (MPDU) aggregation of a most recent OFDMA UL transmission from the plurality of client stations to the AP; and
   the determining the TB PPDU length for the next OFDMA UL transmission depends on the level of MPDU aggregation.

5. The method of claim 3, wherein the TB PPDU length comprises a first TB PPDU length, the next OFDMA UL transmission comprises a first next OFDMA UL transmission, and the scheduling is included in a first trigger frame, the method further comprising:
   receiving the first next OFDMA UL transmission from the plurality of client stations;
   determining a padding duration of the first next OFDMA UL transmission;

determining a second TB PPDU length for a second next OFDMA UL transmission based at least on the padding duration of the first next OFDMA UL transmission; and sending the plurality of client stations a second trigger frame with the determined second TB PPDU length to initiate the second next OFDMA UL transmission from the plurality of client stations to the AP.

6. The method of claim 5, wherein in response to determining that the padding duration is greater than zero, determining the second TB PPDU length for the second next UL transmission comprises decreasing the first TB PPDU length to the second TB PPDU length by an amount that depends on the padding duration.

7. The method of claim 5, wherein in response to determining that the padding duration is zero, determining the second TB PPDU length for the second next UL transmission comprises increasing the first TB PPDU length to the second TB PPDU length.

8. The method of claim 1, wherein determining the one or more UL durations for the next UL transmission is further based on a target number of UL transmissions or a target latency.

9. The method of claim 1, wherein:
the next UL transmission comprises a next time division multiple access (TDMA) UL frame; and
the determining the one or more UL durations comprises determining a plurality of client-specific UL durations of a plurality of TDMA time slots for the plurality of client stations in the next TDMA UL frame.

10. The method of claim 1, wherein:
the collecting the UL transmission statistics includes collecting unused allocated UL duration; and
one of:
in response to determining that the unused allocated UL duration is greater than zero, determining the one or more UL durations for the next UL transmission comprises decreasing a preceding UL duration; or
in response to determining that the unused allocated UL duration is zero, determining the one or more UL durations for the next UL transmission comprises increasing a preceding UL duration.

11. The method of claim 1, further comprising:
collecting downlink (DL) transmission statistics for DL transmissions from the AP to the plurality of client stations
estimating, based on the DL transmission statistics, a second amount of queued UL data at the plurality of client stations for a second next UL transmission;
determining, based on the estimated second amount of queued UL data and the DL transmission statistics, one or more UL durations for the second next UL transmission; and
sending the plurality of client stations scheduling information with the determined one or more UL durations to initiate the second next UL transmission from the plurality of client stations to the AP.

12. A wireless communication device, comprising:
a processor device; and
a non-transitory computer-readable storage medium communicatively coupled to the processor device and having computer-readable instructions stored thereon that are executable by the processor device to perform or control performance of operations comprising:
collecting uplink (UL) transmission statistics for UL transmissions from a plurality of client stations to an access point (AP);
estimating, based on the UL transmission statistics, an amount of queued UL data at the plurality of client stations for a next UL transmission;
determining, based on the estimated amount of queued UL data and the UL transmission statistics, one or more UL durations for the next UL transmission; and
sending the plurality of client stations scheduling information with the determined one or more UL durations to initiate the next UL transmission from the plurality of client stations to the AP.

13. The wireless communication device of claim 12, wherein collecting the UL transmission statistics includes collecting at least one of:
received signal strength indicator (RSSI);
packet error rate (PER);
number of retries;
number of UL transmissions over a preceding window of a selected duration of time;
padding duration UL transmissions from the plurality of client stations to the AP;
unused allocated UL duration;
level of media access control (MAC) protocol data unit (MPDU) aggregation of the UL transmissions;
number of bytes transmitted in the UL transmissions;
modulation and coding scheme (MCS) of the UL transmissions;
UL queue size estimate of each of the plurality of client stations reported in a most recent buffer status report (BSR) from each of the plurality of client stations; or
UL queue size estimate of each of the plurality of client stations reported in a most recent Quality of Service (QoS) Control field of a MAC frame from each of the plurality of client stations.

14. The wireless communication device of claim 12, wherein the one or more UL durations comprises a trigger-based (TB) physical (PHY) layer protocol data unit (PPDU) length and the next UL transmission comprises a next orthogonal frequency division multiple access (OFDMA) UL transmission.

15. The wireless communication device of claim 14, wherein:
the collecting the UL transmission statistics includes collecting a level of media access control (MAC) protocol data unit (MPDU) aggregation of a most recent OFDMA UL transmission from the plurality of client stations to the AP; and
the determining the TB PPDU length for the next OFDMA UL transmission depends on the level of MPDU aggregation.

16. The wireless communication device of claim 14, wherein the TB PPDU length comprises a first TB PPDU length, the next OFDMA UL transmission comprises a first next OFDMA UL transmission, and the scheduling information is included in a first trigger frame, the operations further comprising:
receiving the first next OFDMA UL transmission from the plurality of client stations;
determining a padding duration of the first next OFDMA UL transmission;
determining a second TB PPDU length for a second next OFDMA UL transmission based at least on the padding duration of the first next OFDMA UL transmission; and
sending the plurality of client stations a second trigger frame with the determined second TB PPDU length to initiate the second next OFDMA UL transmission from the plurality of client stations to the AP.

17. The wireless communication device of claim 16, wherein:
- in response to determining that the padding duration is greater than zero, determining the second TB PPDU length for the second next UL transmission comprises decreasing the first TB PPDU length to the second TB PPDU length by an amount that depends on the padding duration; or
- in response to determining that the padding duration is zero, determining the second TB PPDU length for the second next UL transmission comprises increasing the first TB PPDU length to the second TB PPDU length according to a predetermined formula or by a predetermined amount of bytes or a predetermined percentage.

18. The wireless communication device of claim 11, wherein:
- the next UL transmission comprises a next time division multiple access (TDMA) UL frame; and
- the determining the one or more UL durations comprises determining a plurality of client-specific UL durations of a plurality of TDMA time slots for the plurality of client stations in the next TDMA UL frame.

19. The wireless communication device of claim 11, wherein:
- the collecting the UL transmission statistics includes collecting unused allocated UL duration; and one of:
  - in response to determining that the unused allocated UL duration is greater than zero, determining the one or more UL durations for the next UL transmission comprises decreasing a preceding UL duration; or
  - in response to determining that the unused allocated UL duration is zero, determining the one or more UL durations for the next UL transmission comprises increasing a preceding UL duration.

20. A non-transitory computer-readable storage medium having computer-readable instructions stored thereon that are executable by a processor device to perform or control performance of operations comprising:
- collecting uplink (UL) transmission statistics between a plurality of client stations and an access point (AP);
- estimating, based on the UL transmission statistics, an amount of queued UL data at the plurality of client stations for a next UL transmission;
- determining, based on the estimated amount of queued UL data and the UL transmission statistics, one or more UL durations for the next UL transmission; and
- sending the plurality of client stations scheduling information with the determined one or more UL durations to initiate the next UL transmission from the plurality of client stations to the AP.

* * * * *